US008261595B2

(12) United States Patent
Szepek et al.

(10) Patent No.: US 8,261,595 B2
(45) Date of Patent: Sep. 11, 2012

(54) METHOD AND SYSTEM FOR FLUID VALVE LEAK DETECTION

(75) Inventors: Scott William Szepek, Glenville, NY (US); Justin Varkey John, Cohoes, NY (US); Daniel Joseph Peczka, Clifton Park, NY (US); Bryan Edward Sweet, Valatie, NY (US)

(73) Assignee: General Electric Company, Schenectady, NY (US)

( * ) Notice: Subject to any disclaimer, the term of this patent is extended or adjusted under 35 U.S.C. 154(b) by 381 days.

(21) Appl. No.: 12/611,228

(22) Filed: Nov. 3, 2009

(65) Prior Publication Data

US 2011/0100096 A1    May 5, 2011

(51) Int. Cl.
*G01M 3/08* (2006.01)
(52) U.S. Cl. .......................................... 73/46
(58) Field of Classification Search ....................... 73/46
See application file for complete search history.

(56) References Cited

U.S. PATENT DOCUMENTS

| 4,825,198 A | 4/1989 | Rolker et al. |
| 6,128,946 A | 10/2000 | Leon et al. |

OTHER PUBLICATIONS

European Search Report issued in connection with EP Application No. 10189172.9, Mar. 31, 2011.

*Primary Examiner* — Hezron E Williams
*Assistant Examiner* — Rodney T Frank
(74) *Attorney, Agent, or Firm* — Cantor Colburn LLP

(57) ABSTRACT

A method detection of leakage through at least one first valve includes admitting an amount of fluid into a first control volume in operable communication with the at least one first valve, thereby pressurizing the first control volume. The first control volume is isolated and a rate of change of pressure in a second control volume in operable communication with the at least one first valve is measured. A system for detecting leakage across at least one first valve includes a first control volume receptive of an amount of fluid and a second control volume in flow communication with the first control volume. At least one first valve is located between the first control volume and the second control volume, and a rate of change in pressure in the second control volume indicates a rate of leakage through the at least one first valve.

18 Claims, 1 Drawing Sheet

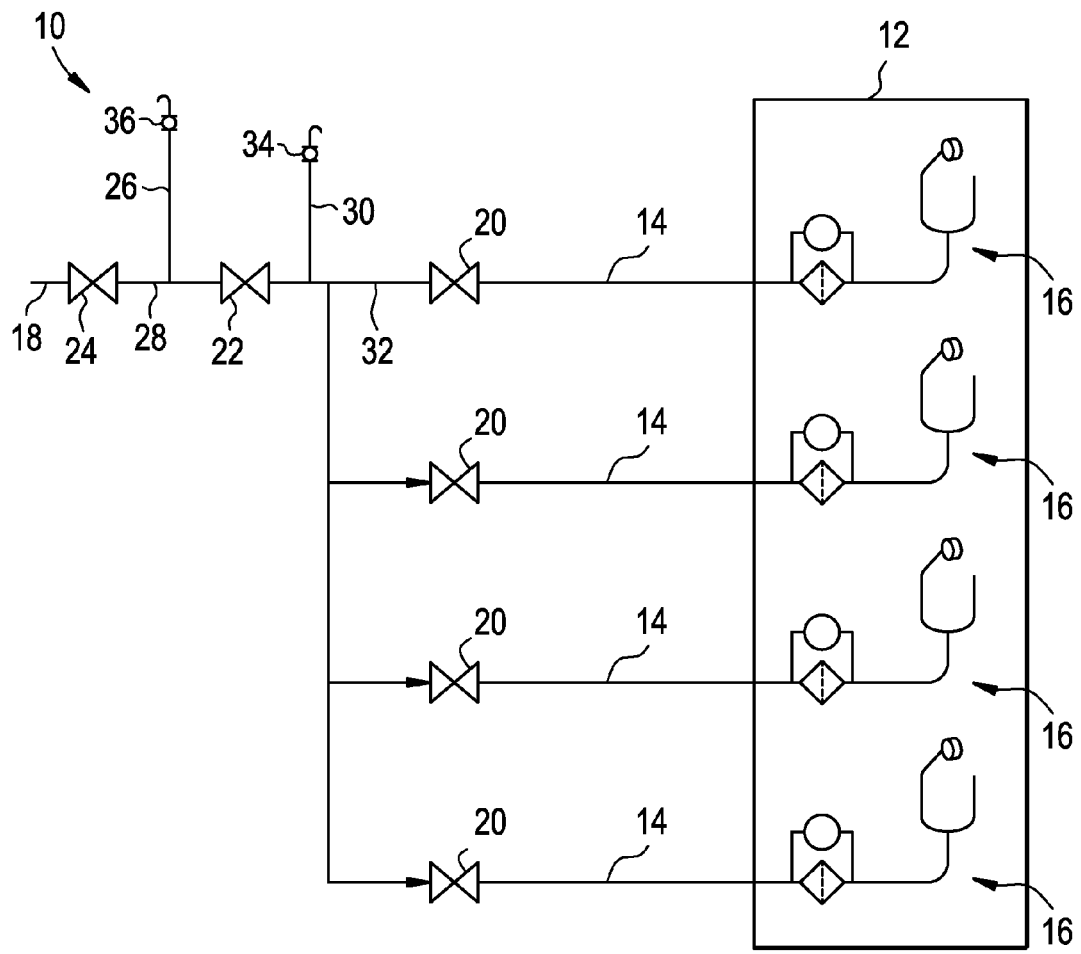

METHOD AND SYSTEM FOR FLUID VALVE LEAK DETECTION

BACKGROUND OF THE INVENTION

The subject matter disclosed herein generally relates to fluid valves. More specifically, this disclosure relates to detection of leakage from fluid valves.

Valves are widely used in, for example power generation systems such as gas turbines, and are often applied in fuel systems which provide fuels, for example, gas, to the power generation systems. In some conditions, for example, at startup of the power generation system, excess leakage from fuel valves can result in damage such as rupture or explosion of components of the power generation system. To reduce the likelihood of such damage, valve leakage checks are often performed prior to startup of the power generation system. Typically these leakage checks compare a pressure upstream of a valve at a start of the check with a pressure after a predetermined amount of time has elapsed. The amount of pressure drop over the time period is then compared to a threshold. Conventional leakage checks performed in this manner are time consuming and yield many false-positive results since by solely determining a difference in pressure, the conventional check does not accommodate fuel leakage from multiple fuel valves during testing, the conventional check does not take into account varying fuel operating conditions.

BRIEF DESCRIPTION OF THE INVENTION

According to one aspect of the invention, a method detection of leakage through at least one first valve includes admitting an amount of fluid into a first control volume in operable communication with the at least one first valve, thereby pressurizing the first control volume. The first control volume is isolated and a rate of change of pressure in a second control volume in operable communication with the at least one first valve is measured.

According to another aspect of the invention, a system for detecting leakage across at least one first valve includes a first control volume receptive of an amount of fluid and a second control volume in flow communication with the first control volume. At least one first valve is located between the first control volume and the second control volume. The at least one first valve is capable of controlling flow of the fluid between the first control volume and the second control volume, wherein a rate of change in pressure in the second control volume indicates a rate of leakage through the at least one first valve.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 1 is a schematic illustration of an embodiment of a fuel system for a gas turbine.

The detailed description explains embodiments of the invention, together with advantages and features, by way of example with reference to the drawings.

DETAILED DESCRIPTION OF THE INVENTION

Shown in FIG. 1 is a schematic of a fuel system 10 for, for example, a gas turbine 12. The fuel system 10 includes a plurality of fuel lines 14 connected to the gas turbine 12 to provide a flow of fuel thereto. In some embodiments, the plurality of fuel lines 14 are connected to a plurality of fuel distribution manifolds 16 in the gas turbine 12 to distribute fuel to desired nozzles (not shown). As shown in FIG. 1, the plurality of fuel lines 14 may be arranged in parallel and may be fed from a common supply header 18. The plurality of fuel lines 14 may include a plurality of gas control valves 20 therein, for example, one gas control valve 20 disposed at each fuel line 14, to control a flow of fuel from the supply header 18 through the associated fuel line 14. It is to be appreciated that while the embodiment of FIG. 1 includes 4 gas control valves 20, other quantities of gas control valves 20, for example, 2, 8 or 12 gas control valves 20 are contemplated within the present scope.

The supply header 18 may contain one or more valves, for example a stop-speed ratio valve 22 and an auxiliary stop valve 24, which in some embodiments is disposed upstream from the stop-speed ratio valve 22. The supply header 18 may include an auxiliary stop cavity vent 26 disposed between the auxiliary stop valve 24 and the stop-speed ratio valve 22 at a P1 cavity 28. Similarly, a P2 cavity vent 30 is disposed between the stop-speed ratio valve 22 and the plurality of gas control valves 20 at a P2 cavity 32 and includes a P2 cavity vent valve 34.

At some conditions, for example, startup of the gas turbine 12, it may be desired to determine if excess leakage exists in the fuel system 10 at the stop-speed ratio valve 22 and the plurality of gas control valves 20. To evaluate stop-speed ratio valve 22 leakage flow, an auxiliary stop cavity vent valve 36 disposed at the auxiliary stop cavity vent 26 and the P2 cavity vent valve 34 are closed and the auxiliary stop valve 24 is opened to pressurize the P1 cavity 28. P2 cavity 32 pressure is then monitored for an unacceptable rate of change that indicates unacceptable leakage from the P1 cavity 28 into the P2 cavity 32 via the stop-speed ratio valve 22.

To evaluate leakage through the plurality of gas control valves 20, the stop-speed ratio valve 22 is opened to pressurize the P2 cavity 32, then closed. Pressure of the P2 cavity is again monitored for a rate of change that is indicative of unacceptable leakage through the plurality of gas control valves 20. To accurately evaluate the leakage through the plurality of gas control valves 20, it is desired to reduce the influence of any leakage through the stop-speed ratio valve 22 on the test. Thus, the rate of change of pressure in the P2 cavity 32 is monitored only in a short time span after opening and closing the stop-speed ratio valve 22 to pressurize the P2 cavity 32. Since the pressure difference between the P1 cavity 28 and the P2 cavity 32 is small, leakage through the stop-speed ratio valve 22 is minimal. Similarly, when determining leakage through the stop-speed ratio valve 22, the rate of change in pressure in the P2 cavity 32 is measured only in a short time span following pressurization of the P1 cavity 28 by opening the auxiliary stop valve 24. In this case, leakage through the plurality of gas control valves 20 is low since a pressure buildup in the P2 cavity 32 has not yet occurred.

Typically, leakage through a valve is compared to a predetermined acceptable limit, and if the leakage exceeds the limit, the leakage may need to be corrected prior to continuing operation. The limits are normally expressed as leakage classes, where, for example, a Class II limit allows for leakage of 0.5% valve flow capacity, Class III allows for leakage of 0.1% of valve flow capacity and Class IV allows for leakage of 0.01% of valve flow capacity. These classes, however, are generally defined based on mass flow of air through the valve in question. Since fuels have different mass properties than air, to more accurately determine leakage based on pressure change, the specification values may be corrected utilizing properties of the fuel in the fuel system 10, for example, methane, and also corrected for, for example, temperature and/or pressure of the fuel utilized. Application of correction factors is expressed in equation 1:

$$\text{MaxLeakage}_{actual} = \text{Max Leakage}_{spec} \times C_{2fuel} \times \text{sqrt}(SG_{fuel}/Z_{fuel}) \quad (1)$$

where $C_{2fuel}$ is a valve correction coefficient for gas fuel ratio of specific heats, $SG_{fuel}$ is the specific gravity of the particular fuel and $Z_{fuel}$ is the gas fuel compressibility factor. Expressed as a pressure change over time, the maximum allowable leakage during a test of the stop-speed ratio valve 22 leakage may be:

$$dP/dt_{allowableSRV} = (K_2/K_1) \times (P_1/\text{sqrt}(T)) \times \text{Max Leakage}_{spec} \times C_{2fuel} \times \text{sqrt}(SG_{fuel}/Z_{fuel}). \quad (2)$$

$P_1$ is the initial pressure of the pressurized P2 cavity 32 at the time of the test and T is the temperature of the P2 cavity 32. $K_1$ adjusts for the volume of the P2 cavity 32 as well as the temperature of the P2 cavity 32 and may be expressed:

$$K_1 = (144 \times V \times MW_{fuel})/(R_{univ} \times T) \quad (2)$$

V is the volume of the P2 cavity 32. T is the temperature of the P2 cavity 32. $MW_{fuel}$ is the molecular weigh of the particular fuel. $R_{univ}$ is the universal gas constant.

$K_2$ is derived from the valve flow equation and may be expressed as:

$$K_2 = 4.83 \times 10^{-4} \times C_{2fuel} \times \text{sqrt}(SG_{fuel}/Z_{fuel}) \quad (3)$$

In an example where the maximum desired specification leakage is a Class III leakage, or 0.1% valve capacity at full travel, the allowable leakage is expressed as:

$$dP/dt_{allowableSRV} = (K_2/K_1) \times (P_1/\text{sqrt}(T)) \times ((0.1/100) \times C_{gmaxSRV}) \times C_{2fuel} \times \text{sqrt}(SG_{fuel}/Z_{fuel}) \quad (4)$$

where $C_{gmaxSRV}$ is the valve capacity of the stop speed ratio valve 22.

Similarly, the maximum allowable leakage of the plurality of gas control valves 20 may be expressed as:

$$dP/dt_{allowableGCV} = (-K_2/K_1) \times (P_2/\text{sqrt}(T)) \times C_{2fuel} \times \text{sqrt}(SG_{fuel}/Z_{fuel}) \times \Sigma \text{MaxLeakage}_{spec\ GCV} \quad (5)$$

where $\Sigma \text{MaxLeakage}_{spec\ GCV}$ is a sum of maximum allowable leakages for the plurality of gas control valves 20. For example, for a maximum desired leakage of Class III and a fuel system 10 having four gas control valves 20, the resulting total allowable leakage through the gas control valves 20 is:

$$dP/dt_{allowableGCV} = (-K_2/K_1) \times (P_2/\text{sqrt}(T)) \times C_{2fuel} \times \text{sqrt}(SG_{fuel}/Z_{fuel}) \times (0.1/100) \times (C_{gmaxGCV1} + C_{gmaxGCV2} + C_{gmaxGCV3} + C_{gmaxGCV4}). \quad (6)$$

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of detection of leakage through at least one first valve comprising:
    admitting an amount of fluid into a first control volume in operable communication with the at least one first valve, thereby pressurizing the first control volume;
    isolating the first control volume;
    measuring a rate of change of pressure in a second control volume in operable communication with the at least one first valve wherein the rate of change of pressure in the second control volume indicates a rate of leakage from the first control volume into the second control volume; and
    comparing the rate of leakage to a first limit;
    wherein the first limit is determined utilizing two or more properties of the fluid, including pressure and at least one of temperature, specific gravity, specific heat ratio, and gas fuel compressibility factor.

2. The method of claim 1 wherein isolating the first control volume comprises closing one or more fluid pathways in operable communication with the first control volume.

3. The method of claim 1 wherein the first limit is calculated as a function of valve leakage classification.

4. The method of claim 1 comprising actively calculating the first limit.

5. The method of claim 1 wherein the at least one first valve is at least one stop-speed ratio valve.

6. The method of claim 1 comprising:
    opening the at least one first valve to allow flow of a fluid therethrough;
    isolating the second control volume; and
    measuring a rate of change of pressure in the second control volume to determine an amount of leakage through at least one second valve in operable communication with the second control volume.

7. The method of claim 6 wherein isolating the second control volume comprises closing the at least one first valve.

8. The method of claim 6 comprising evaluating the leakage through the at least one second valve after a pressure buildup occurring in the second control volume.

9. The method of claim 6 comprising comparing the rate of change of pressure to a second limit.

10. The method of claim 9 comprising actively calculating the second limit based on one or more properties of the fluid.

11. The method of claim 10 wherein the one or more properties include one or more of temperature, pressure, specific gravity, specific heat ratio, and gas fuel compressibility factor.

12. The method of claim 9 wherein the second limit is a sum of maximum allowable leakages through each second valve of the at least one second valve.

13. The method of claim 6 wherein the at least one second valve is at least one gas control valve.

14. The method of claim 13 wherein the at least one gas control valve is four gas control valves.

15. The method of claim 1 wherein the at least one first valve is disposed at a fuel system of a gas turbine.

16. A system for detecting leakage across at least one first valve comprising:
    a first control volume receptive of an amount of fluid;
    a second control volume in flow communication with the first control volume; and
    at least one first valve disposed between the first control volume and the second control volume, the at least one first valve capable of controlling flow of the fluid between the first control volume and the second control volume, wherein a rate of change in pressure in the second control volume indicates a rate of leakage through the at least one first valve, the rate of leakage compared to a first limit determined utilizing two or more properties of the fluid, including pressure and at least one of temperature, specific gravity, specific heat ratio, and gas fuel compressibility factor.

17. The system of claim 16 wherein the first limit is calculated as a function of valve leakage classification.

18. The system of claim 16 comprising:
at least one second valve in flow communication with the second control volume;
a means of measuring a rate of change in pressure in the second control volume when the second control volume is isolated thereby indicating a rate of leakage through the at least one second valve.

* * * * *